United States Patent
Hsin et al.

(10) Patent No.: US 10,742,284 B2
(45) Date of Patent: Aug. 11, 2020

(54) BEAMFORMER AND WIRELESS COMMUNICATION METHOD THEREOF FOR IMPROVING COMMUNICATION QUALITY

(71) Applicant: Realtek Semiconductor Corp., HsinChu (TW)

(72) Inventors: Chien-Wei Hsin, Kaohsiung (TW); Chung-Yao Chang, Hsinchu County (TW)

(73) Assignee: Realtek Semiconductor Corp., HsinChu (TW)

( * ) Notice: Subject to any disclaimer, the term of this patent is extended or adjusted under 35 U.S.C. 154(b) by 771 days.

(21) Appl. No.: 14/580,227

(22) Filed: Dec. 23, 2014

(65) Prior Publication Data

US 2015/0180562 A1   Jun. 25, 2015

(30) Foreign Application Priority Data

Dec. 24, 2013   (TW) .............................. 102148003 A

(51) Int. Cl.
*H04B 7/06*   (2006.01)

(52) U.S. Cl.
CPC ................. *H04B 7/0617* (2013.01)

(58) Field of Classification Search
CPC .. H04B 7/0639; H04B 7/0617; H04B 7/0619; H04B 7/068; H04L 1/0643; H04L 1/0618; H04W 88/08
See application file for complete search history.

(56) References Cited

U.S. PATENT DOCUMENTS

| | | | | |
|---|---|---|---|---|
| 2007/0249402 | A1* | 10/2007 | Dong .................. | H04B 7/0408 455/562.1 |
| 2010/0309867 | A1* | 12/2010 | Palanki ................ | H04L 5/0053 370/329 |
| 2011/0034193 | A1* | 2/2011 | Park .................... | H04B 17/309 455/509 |
| 2011/0085448 | A1 | 4/2011 | Kuwahara | |
| 2013/0005376 | A1* | 1/2013 | Shirani-Mehr ..... | H04W 72/048 455/509 |
| 2013/0102345 | A1* | 4/2013 | Jung ................... | H04B 7/0456 455/513 |
| 2015/0099527 | A1* | 4/2015 | Zhuang ................ | H04B 7/024 455/452.1 |
| 2015/0200718 | A1* | 7/2015 | Sajadieh ............... | H04L 5/0085 375/267 |

FOREIGN PATENT DOCUMENTS

| | | |
|---|---|---|
| CN | 102045723 A | 5/2011 |
| TW | 201021457 | 6/2010 |

\* cited by examiner

*Primary Examiner* — Mansour Oveissi
(74) *Attorney, Agent, or Firm* — Winston Hsu

(57) ABSTRACT

A wireless communication method applied to a beamformer includes: receiving a plurality of reference information corresponding to a plurality of stations, respectively; calculating an evaluation value for each of the stations according to at least one reference information of the plurality of reference information; and comparing a plurality of evaluation values respectively corresponding to the plurality of stations, to select specific stations from the plurality of stations for performing beamforming.

20 Claims, 5 Drawing Sheets

BEAMFORMER AND WIRELESS COMMUNICATION METHOD THEREOF FOR IMPROVING COMMUNICATION QUALITY

BACKGROUND OF THE INVENTION

1. Field of the Invention

The present invention relates to wireless communication techniques, and more particularly, to a wireless communication method and a beamformer capable of moderately selecting stations to be performed with beamforming.

2. Description of the Prior Art

With the popularity of wireless transmission applications such as using wireless fidelity (WiFi) to stream high definition movies and TV programs to a notebook, playing online games, browsing social media, or watching movies on a handheld device such as a tablet or a smart phone, a home user may concurrently download internet content using multiple WiFi devices. Increasing wireless transmission speed is therefore a trend in the field. Presently, some of wireless communication devices of which there operation frequency bands could be the same or overlap to each other, such as Bluetooth (BT) devices, cordless phones, and some 802.11b/g/n devices, which makes signal interference even more severe.

Beamforming is a technique applied to wireless transmissions. The beamforming technique calculates the influence of the channel on the receiver, and then compensates this influence at the transmitter in advance, thereby lowering the software and hardware requirements of the receiver to improve the transmission efficiency. Although the beamforming technique has been applied to the 802.11n system, the 802.11n specifications adopted by different manufacturers may not be compatible with each other.

The most current specification of the wireless local area network (WLAN) is 802.11ac. In contrast with 802.11n, the 802.11ac specifications adopted by different manufacturers are compatible with each other. Further, since the 802.11ac specifications operate on the 5 GHz frequency band which is less crowded than the 2.4 GHz frequency band, the possibility of multiple wireless devices sharing the same frequency band is decreased.

If there are multiple stations that have the beamforming function and are connected to the same beamformer (e.g. an access point) for performing wireless transmissions, the beamformer must store the channel state information (CSI) report of each channel connected to the beamformer, so that each station has the benefit of beamforming. The amount of hardware required for the beamformer to be capable of supporting beamforming needs to be increased, which raises the equipment cost and means the system loading will become heavier. The efficiency is therefore reduced.

In view of the above, how to effectively use the beamforming technique to raise the wireless transmission efficiency is an important issue in the field.

SUMMARY OF THE INVENTION

One of the objectives of the present invention is to provide a wireless communication method and an associated beamformer that uses the beamforming technique, wherein a selection mechanism is utilized to select stations for performing beamforming.

An embodiment of the present invention provides a wireless communication method applied to a beamformer. The method comprises: receiving a plurality of reference information corresponding to a plurality of stations, respectively; calculating an evaluation value for each of the stations according to at least one reference information of the plurality of reference information; and comparing a plurality of evaluation values respectively corresponding to the plurality of stations in order to select specific stations from the plurality of stations for performing beamforming.

Another embodiment of the present invention provides a beamformer. The beamformer comprises a receiving circuit and a control circuit. The receiving circuit is arranged for receiving a plurality of reference information corresponding to a plurality of stations, respectively. The control circuit is arranged for calculating an evaluation value for each of the stations according to at least one reference information of the plurality of reference information, and comparing a plurality of evaluation values respectively corresponding to the plurality of stations in order to select specific stations from the plurality of stations for performing beamforming.

Through the methods provided by the present invention, the connection quality between a beamformer and a plurality of stations can be greatly improved even though the hardware of the beamformer is limited. The problems existing in the related arts, such as stations which require the beamforming technique cannot be effectively selected, or raised costs due to configuring too much hardware, can be solved.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should not be interpreted as a close-ended term such as "consist of". Also, the term "couple" is intended to mean either an indirect or direct electrical connection. Accordingly, if one device is coupled to another device, that connection may be through a direct electrical connection, or through an indirect electrical connection via other devices and connections.

Figure 1:
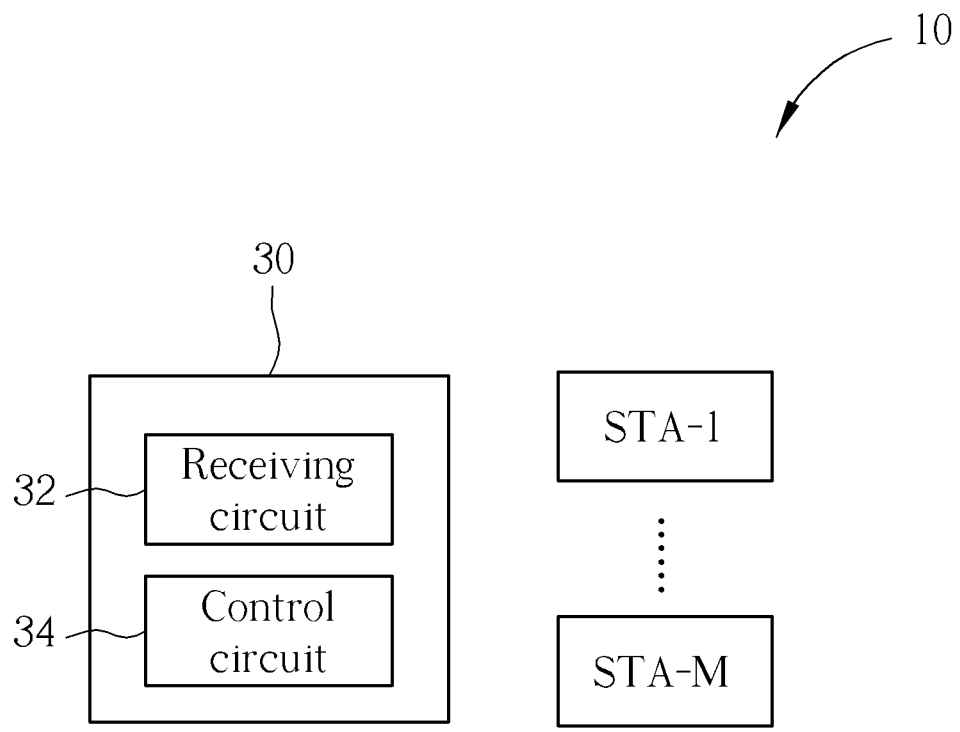
FIG. 1 is a diagram illustrating a wireless communication system including a beamformer according to an embodiment of the present invention.

Refer to FIG. 1, which is a diagram illustrating a wireless communication system including a beamformer according to an embodiment of the present invention. The wireless communications system 10 includes a beamformer 30 and a plurality of stations STA-1 to STA-M, and the beamformer 30 includes a receiving circuit 32 and a control circuit 34. The present invention does not limit the number of the stations, such that M may be any positive integer. The receiving circuit 32 is used to receive a plurality of reference information corresponding to the plurality of stations STA-1 to STA-M, respectively. Each station provides a plurality of reference information to the beamformer 30. The control circuit 34 is arranged for calculating an evaluation value for each of the stations STA-1 to STA-M according to at least one reference information of the plurality of reference information. Further, the control circuit 34 is used to compare a plurality of evaluation values corresponding to the plurality of stations STA-1 to STA-M, respectively, to select specific stations from the plurality of stations that require the beamforming technique. Assume there are M stations connected to the beamformer 30, and the beamformer 30 has N hardware capable of performing beamforming operations for storing the channel state information (CSI) report that records the state of the channel between the beamformer 30 and stations, and capable of storing the reference information of the stations, wherein M and N are both positive integers (N>1, and M>N). Under the situation that the hardware capable of performing beamforming operations is limited, how to properly select these N (or less than N) stations having lower connection quality to be performed with beamforming operations is a problem to be solved. The following paragraphs will describe how the present invention effectively improves the connection quality between a beamformer and stations.

Figure 2:
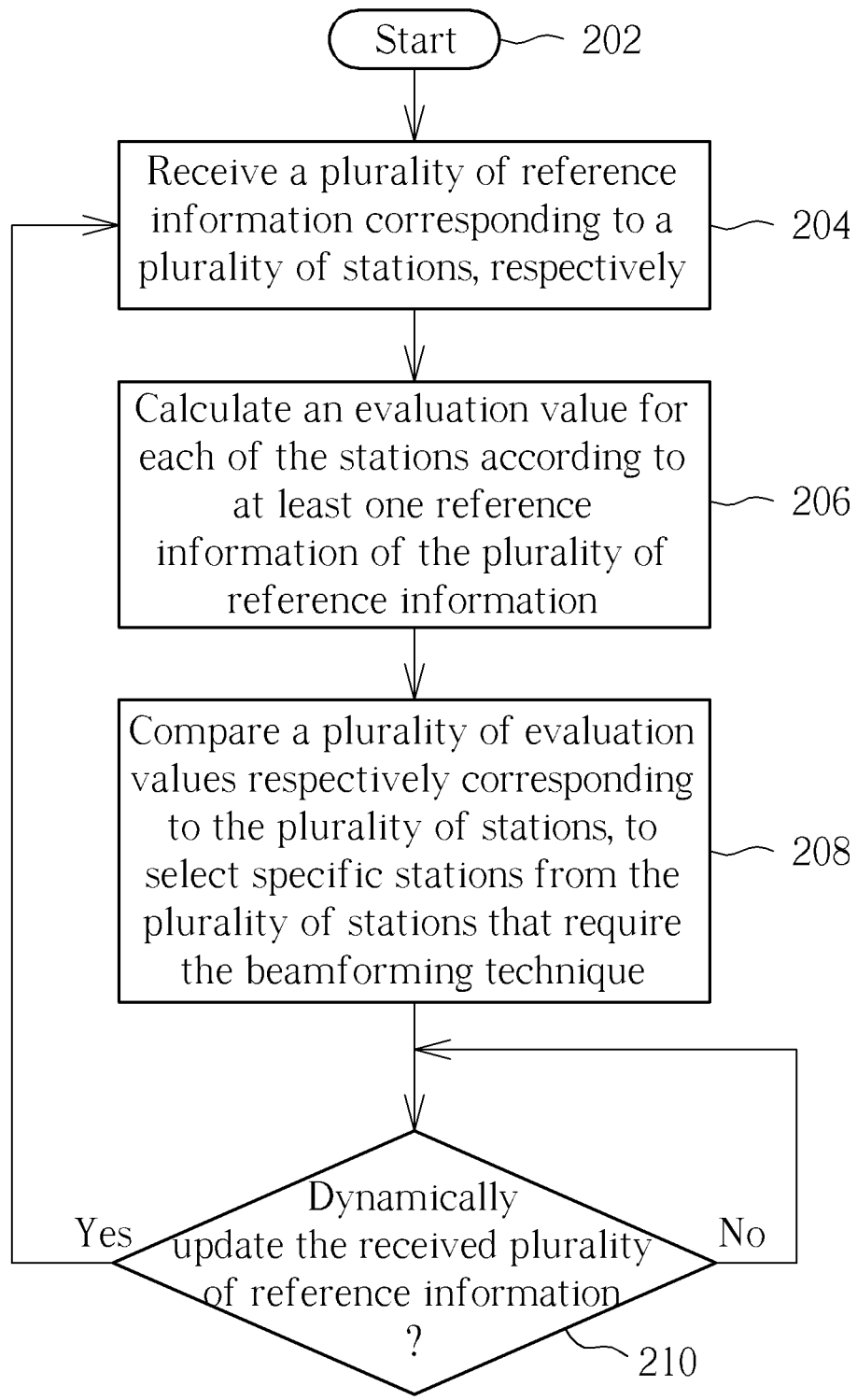
FIG. 2 is a flowchart illustrating a wireless communication method applied to the beamformer shown in FIG. 1.

Refer to FIG. 2, which is a flowchart illustrating a wireless communication method applied to the beamformer shown in FIG. 1. Note that if the result is substantially the same, the steps are not required to be executed in the exact order shown in FIG. 2. The exemplary method shown in FIG. 2 may be briefly summarized as follows.

Step 202: Start.

Step 204: Receive a plurality of reference information corresponding to a plurality of stations, respectively.

Step 206: Calculate an evaluation value for each of the stations according to at least one reference information of the plurality of reference information.

Step 208: Compare a plurality of evaluation values respectively corresponding to the plurality of stations, to select specific stations from the plurality of stations that require the beamforming technique.

Step 210: Determine whether to dynamically update the received plurality of reference information. If yes, go to step 204; otherwise, keep performing step 210.

Note that, in the above steps, the number of stations is M, the number of selected specific stations is N, and M and N are both positive integers, wherein N>1 and M>N.

In step 204, the reference information can be information of whether the station has a function of receiving beamforming, the data traffic amount between the station and the beamformer, the encoding/decoding type of the station, the diversity of the station, or the connection quality between the station and the beamformer. In step 206, the beamformer generates at least a judgment result according to the received reference information. For example, the judgment result may comprise determining whether the stations have the function of performing the beamforming operations, determining data traffic amount between the stations and the beamformer, determining the encoding/decoding type of the stations, determining whether the stations have the diversity ability, or determining the connection quality between the stations and the beamformer, etc. An evaluation value can then be calculated for each of the stations according to at least one of these judgment results.

In this embodiment, the aforementioned means for calculating the evaluation value can be singly or jointly applied based on the actual requirements. Further, different weightings may be assigned based on different determining means, and the evaluation value is calculated through summoning all of the assigned weightings, so as to determine whether to perform beamforming operations on this station. In one implementation, if a station has a higher evaluation value, it means that this station already has a relatively high communication quality, and therefore does not require beamforming operations to improve the communication quality thereof. Under the situation where the beamformer has limited beamforming hardware, stations with a relatively high evaluation value will not be selected to be performed with beamforming operations.

The detailed means for calculating the evaluation are described as follows. If a station is determined to not have the function of receiving beamforming according to reference information, this station will be given a highest weighting, and the beamformer will not perform beamforming operations on this station.

Whether a station is idle can be known through determining the data traffic amount between this station and the beamformer. If the internet data flow of this station is relatively low or this station is in an idle state, a relatively high weighting will be assigned to this station, making the beamformer take precedence when performing beamforming operations for other stations.

A weighting might be given to a station based on whether this station is compatible with channel encoding/decoding and based on the channel encoding/decoding type thereof. The channel encoding/decoding type adopted by the station may include the binary convolutional code (BCC), the block code, the low density parity check (LDPC) code, or the turbo Code. Channel encoding may improve the error tolerance of bit transmissions. More specifically, channel encoding may correct bit errors. Different channel encodings may have different error correction abilities, however, and the weighting given to the station may therefore vary based on the channel encoding type. For example, among the aforementioned BCC and LDPC encoding/decoding, since the LDPC encoding/decoding has better error tolerance, the station which adopts the LDPC encoding/decoding will be given a higher weighting.

The diversity ability of a station may depend on the number of antennas and whether this station can be performed with maximum ratio combining (MRC) or space-time block code (STBC). The station with good diversity ability is more resistive to multipath fading effects. For example, when a specific wireless transmission path is severely blocked by barriers while other transmission paths are not blocked or only lightly blocked, the receiver may reach diversity through appropriate combining and selection of the received multipath wireless signals to correctly demodulate the transmitted signals on the receiver. If the receiver supports the operations of multiple antennas, the diversity ability of this receiver is raised. As a result, the station with better diversity ability will be given a higher weighting.

The connection quality between the station and the beamformer can be determined according to at least one of the following parameters: the received signal strength indicator (RSSI), the signal quality (SQ), the signal-to-noise ratio (SNR), the error vector magnitude (EVM), the channel state information (CSI), the bit Error Rate (BER), and the packet error rate (PER). A station with better diversity ability will be given a higher weighting.

In step 210, the operation of dynamically updating the received plurality of reference information may be implemented in various ways through the control circuit 34, e.g. updating the received plurality of reference information in each fixed time period (i.e. the flowchart goes back to step 204 from step 210 in each fixed time period); updating the received plurality of reference information when the number of stations compatible with beamforming changes (i.e. the flowchart goes back to step 204 from step 210 when the number of stations compatible with beamforming changes); and updating the received plurality of reference information when the state of at least one specific station receiving beamforming changes (i.e. the flowchart goes back to step 204 from when the state of the specific station receiving beamforming changes). The state of the specific station which receives beamforming will be determined to be changed when at least one of the following conditions is met: the connection between the beamformer and the specific station is interrupted; the data traffic amount between the station and the specific station is lower than a threshold; the connection quality between the beamformer and the specific station changes; and the specific station cannot receive a sounding packet.

Figure 3:
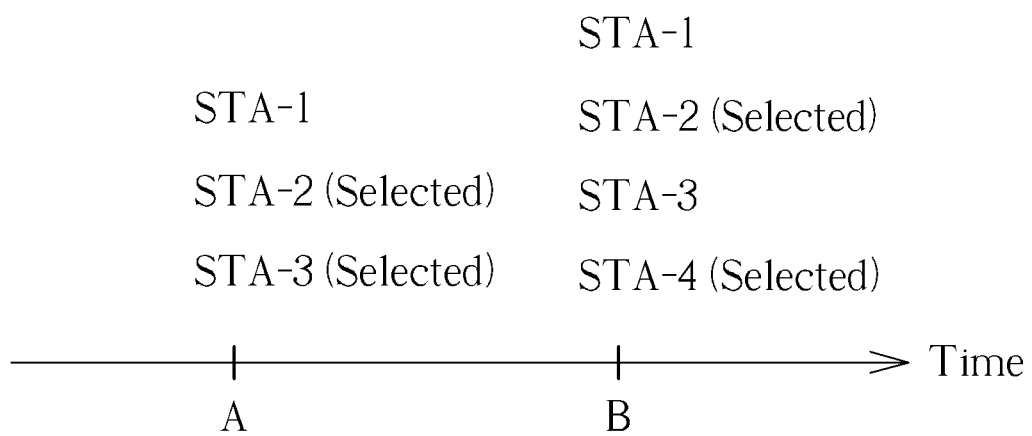
FIG. 3 is a diagram illustrating selection of specific stations that require the beamforming technique in step 208 of FIG. 2.

Refer to FIG. 3 and Tables 1 and 2. FIG. 3 is a diagram illustrating the selection of specific stations that require the beamforming technique as illustrated in step 208 of FIG. 2. Table 1 lists the related information at timing A shown in FIG. 3, and Table 2 lists the related information at timing B. At timing A, three stations STA-1, STA-2 and STA-3 are connected to the beamformer 30 shown in FIG. 1, and are all compatible with beamforming operations. In this example, the aforementioned parameter "M" is chosen to be 3.

TABLE 1

| Station | Received signal strength | Data traffic amount | Encoding ability | Diversity ability | Evaluation value |
|---|---|---|---|---|---|
| STA-1 | 50 | 0 | 0 | 0 | 50 |
| STA-2 | 35 | 0 | 0 | 5 | 40 |
| STA-3 | 15 | 0 | 0 | 0 | 15 |

As can be seen from the above, station STA-1 has the strongest received signal strength, while stations STA-2 and STA-3 have weaker received signal strength; thus, station STA-1 will receive the highest weighting on the event of evaluating the received signal strength. Since station STA-2 has better diversity ability (e.g. station STA-2 has two antennas, while stations STA-1 and STA-3 only have one antenna, respectively), station STA-2 will receive the highest weighting on the event of evaluating the diversity ability. Moreover, because stations STA-1, STA-2 and STA-3 adopt the same encoding/decoding type (e.g. the BBC with lower error tolerance), these three stations will receive the same low weighting on the event of evaluating the received signal strength. In the example illustrated in FIG. 3 and Table 1, assuming that the beamformer 30 can, at most, concurrently perform beamforming for two stations (i.e. the aforementioned parameter "N" is chosen to be 2), stations STA-2 and STA-3 with lower evaluation values will be selected at timing A for performing beamforming. In another embodiment of the present invention, if the beamformer 30 is capable of performing beamforming operations for more stations at the same time (i.e. N≥3), stations STA-1, STA-2 and STA-3 will all be selected.

Next, please refer to Table 2 which shows the states of the stations STA-1, STA-2, STA-3 and STA-4 at timing B. If there is another station STA-4 connected to the beamformer 30 at timing B (i.e. the aforementioned parameter "M" is chosen to be 3), since the number of stations compatible with beamforming changes, the beamformer 30 will dynamically update the received reference information according to step 210. The beamformer 30 will select two stations with lower weightings at timing B for performing beamforming operations.

TABLE 2

| Station | Received signal strength | Data traffic amount | Encoding ability | Diversity ability | Evaluation value |
|---|---|---|---|---|---|
| STA-1 | 50 | 0 | 0 | 0 | 50 |
| STA-2 | 35 | 0 | 0 | 5 | 40 |
| STA-3 | 15 | 80 | 0 | 0 | 95 |
| STA-4 | 20 | 0 | 2 | 0 | 22 |

As can be seen from the above, since station STA-4 has better encoding ability, station STA-4 will get the highest weighting on the event of evaluating the encoding ability. Since station STA-4 adopts a better encoding/decoding type (e.g. the LDPC encoding/decoding with higher error tolerance), station STA-4 will get the highest weighting on the event of evaluating the encoding ability. Moreover, since station STA-3 enters an idle state at timing B from an active state, station STA-3 will get the highest weighting on the event of evaluating the data traffic amount. It can be seen from FIG. 3 and Table 2 that, although the signal received strength of station STA-3 is weaker than that of station STA-2 at timing B, station STA-2 is in an operation state while station STA-3 is in the idle state. The beamformer 30 will therefore still select station STA-2 for performing beamforming operations rather than selecting station STA-3. In the example illustrated by FIG. 3 and Table 2, assume that the beamformer 30 can, at most, concurrently perform beamforming on two stations (i.e. the aforementioned parameter "N" is chosen to be 2). Stations STA-2 and STA-4 with lower evaluation values will be selected for performing beamforming operations at timing B. In other embodiments of the present invention, if the beamformer is capable of performing beamforming operations on more stations at the same time (i.e. N≥4), stations STA-1, STA-2, STA-3 and STA-4 will all be selected.

Figure 4:
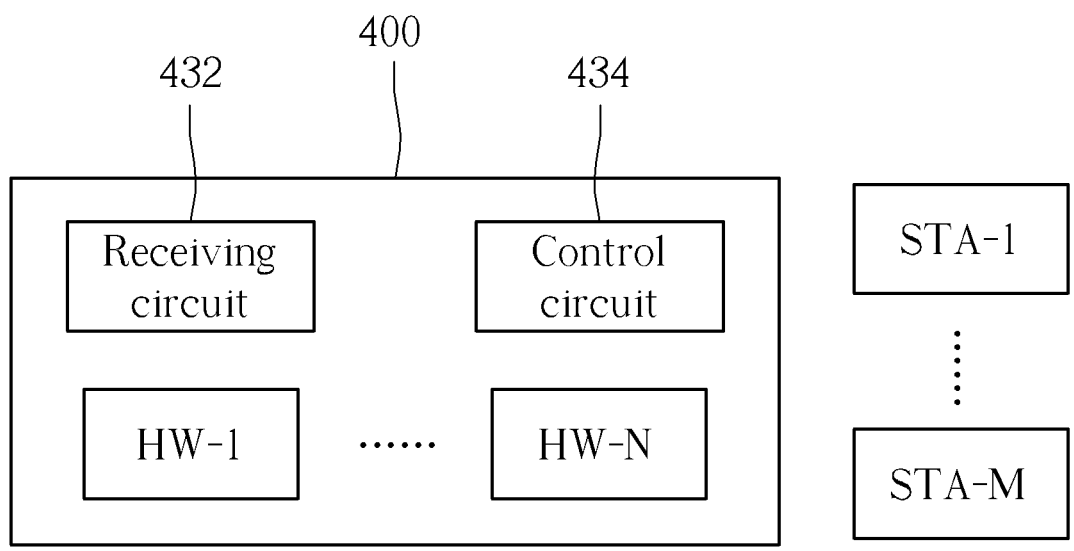
FIG. 4 is a diagram illustrating the beamformer shown in FIG. 1.

Please refer to FIG. 4, which is a diagram illustrating the beamformer shown in FIG. 1. The beamformer 400 is a beamformer capable of performing beamforming operations for N stations at the same time. The beamformer 400 includes N beamforming hardware HW-1 to HW-N arranged for storing the channel state information (CSI) report recording the state between the beamformer and stations, and also storing the reference information of stations. The beamformer 400 further includes a receiving circuit 432 and a control circuit 434. The receiving circuit 432 is used to receive a plurality of reference information corresponding to the plurality of stations. The control circuit 434 is used to select N specific stations from M stations among the plurality of stations capable of receiving beamforming, and to concurrently control the N beamforming hardware HW-1 to HW-N to perform beamforming operations for the N specific stations. Under the communication condition "M>N", the control circuit 434 uses the aforementioned selection mechanism to select N specific stations from the M stations (e.g. the stations which are more distant from the beamformer and have lower error correction ability and/or lower diversity ability are more likely to have higher selection priorities). The data flow and the data transmission quality of these selected stations may be effectively raised even though the number of beamforming hardware is limited (e.g. N beamforming hardware HW-1 to HW-N).

Figure 5:
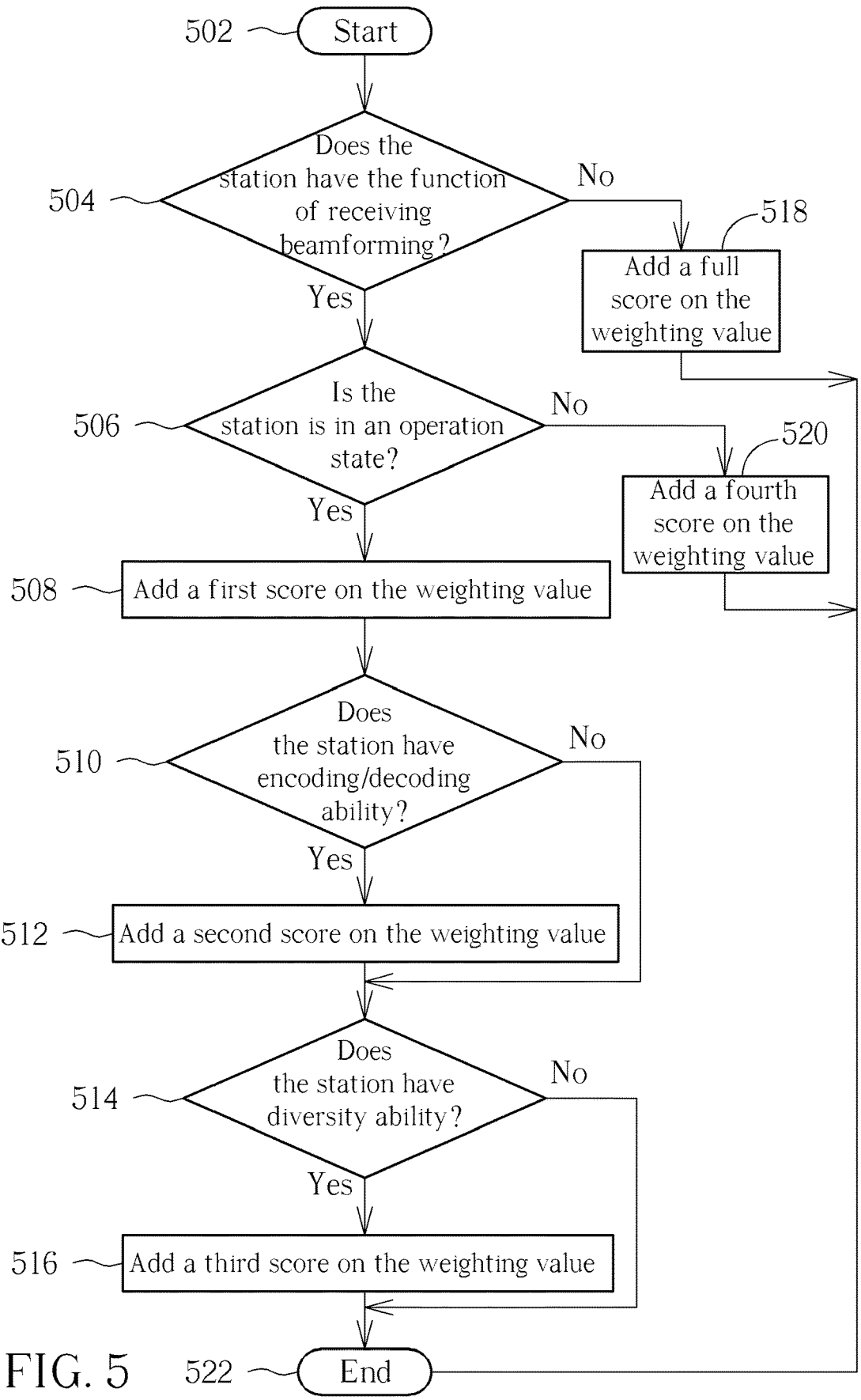
FIG. 5 is a flowchart illustrating the method of calculating an evaluation value according to an embodiment of the present invention.

Refer to FIG. 5, which is a flowchart illustrating an evaluation value according to an embodiment of the present invention. Note that, if the result is substantially the same, the steps are not required to be executed in the exact order shown in FIG. 5. Methods of calculating the evaluation value can refer to the examples shown in Tables 1-2 and in this embodiment. The exemplary method shown in FIG. 5 may be briefly summarized as follows.

Step 502: Start.

Step 504: Determine whether the station has the function of receiving beamforming. If yes, go to step 506; otherwise, go to step 518.

Step 506: Determine whether the station is in an operation state according to the data traffic amount between the station and the beamformer. If the station is in the operation state, go to step 508; otherwise, go to step 520.

Step 508: Add a first score on the weighting value.

Step 510: Determine whether the station has encoding/decoding ability. If yes, go to step 512; otherwise, go to step 514.

Step 512: Add a second score on the weighting value.

Step 514: Determine whether the station has diversity ability. If yes, go to step 516; otherwise, go to step 522.

Step 516: Add a third score on the weighting value.

Step 518: Add a full score on the weighting value; go to step 522.

Step 520: Add a fourth score on the weighting value.

Step 522: End.

Please note that, after performing the aforementioned steps, the final weighting is the exact evaluation value of the station. In step 518, the full score is the highest score. Giving the full score is equivalent to determining the beamformer will not perform the beamforming operations for the station. In step 520, although the fourth score is a little bit lower than the full score, it is still a relatively high score. If a fourth score is further added to the weighting of a station, the beamformer is less likely to perform the beamforming operations for this station. The concepts of other steps can be known by referring to the paragraphs described above, and are omitted here for brevity.

In this embodiment, stations with lower evaluation values are more likely to undergo beamforming operations, but the present invention is not limited thereto. Modifications of this embodiment may reverse the design of the system. For example, when a station is idle, this station is given a lower weighting; when a station has better encoding/decoding ability, this station is given a lower weighting; and when a station has better diversity ability, this station is given a lower weighting. Stations with lower weighting may be viewed as stations with better communication ability/quality, and therefore do not require beamforming operations for raising the communication ability/quality thereof. If the calculated evaluation value of a station is higher, this station is more likely to need beamforming operations to raise the communication ability/quality thereof.

Based on the different applications, the beamformer can be an access point (AP), a router, or a station set in an independent basic service set (IBSS) mode.

Through the methods provided by the present invention, the connection quality between a beamformer and a plurality of stations can be greatly improved even though the beamforming hardware of the beamformer is limited. The problems existing in the related arts where the stations which require the beamforming technique cannot be effectively selected, or raised costs due to too much hardware, can be effectively solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A wireless communication method applied to a beamformer, the method comprising:
   receiving a plurality of reference information from each of a plurality of stations;
   calculating an evaluation value indicating a communication quality of said each of the plurality of stations according to at least one reference information of the plurality of reference information; and
   comparing multiple evaluation values respectively corresponding to the plurality of stations, to select specific stations from the plurality of stations for performing beamforming;
   wherein evaluation values of the specific stations correspond to lowest communication qualities among the communication qualities of the plurality of stations.

2. The method of claim 1, wherein a number of the plurality of stations is M, a number of the specific stations selected from the plurality of stations for performing beamforming is N, and M and N are both positive integers, wherein N>1 and M>N.

3. The method of claim 1, wherein the step of calculating the evaluation value indicating the communication quality of said each of the plurality of stations according to at least one reference information of the plurality of reference information comprises:
   determining whether a station has a capability of receiving a beam according to the plurality of reference information, for the beamformer to generate a judgment result; and
   determining the evaluation value according to at least the judgment result.

4. The method of claim 1, wherein the step of calculating the evaluation value indicating the communication quality of said each of the plurality of stations according to at least one reference information of the plurality of reference information comprises:
   determining a data traffic amount between a station and the beamformer according to the plurality of reference information, to generate a judgment result; and
   determining the evaluation value according to at least the judgment result.

5. The method of claim 1, wherein the step of calculating the evaluation value indicating the communication quality of said each of the plurality of stations according to at least one reference information of the plurality of reference information comprises:
   determining an encoding/decoding type of a station according to the plurality of reference information, to generate a judgment result; and
   determining the evaluation value according to at least the judgment result.

6. The method of claim 5, wherein the encoding/decoding type of a station is binary convolutional code (BCC), block code, low density parity check (LDPC) code, or turbo Code.

7. The method of claim 1, wherein the step of calculating the evaluation value indicating the communication quality of said each of the plurality of stations according to at least one reference information of the plurality of reference information comprises:
  determining diversity ability of a station according to the plurality of reference information, to generate a judgment result; and
  determining the evaluation value according to at least the judgment result.

8. The method of claim 7, wherein the diversity ability of the station comprises a number of antennas comprised in a station, and whether the station is compatible with maximum ratio combining (MRC) or space-time block code (STBC).

9. The method of claim 1, wherein the step of calculating the evaluation value indicating the communication quality of said each of the plurality of stations according to at least one reference information of the plurality of reference information comprises:
  determining connection quality between a station and the beamformer according to the plurality of reference information, to generate a judgment result; and
  determining the evaluation value according to at least the judgment result.

10. The method of claim 9, wherein the connection quality between the station and the beamformer is determined according to at least one of a received signal strength indicator (RSSI), signal quality (SQ), a signal-to-noise ratio (SNR), error vector magnitude (EVM), channel state information (CSI), a bit Error Rate (BER), and a packet error rate (PER).

11. The method of claim 1, wherein the step of receiving the plurality of reference information respectively corresponding to the plurality of stations comprises:
  dynamically updating the received plurality of reference information.

12. The method of claim 11, wherein the step of dynamically updating the received plurality of reference information comprises:
  periodically updating the received plurality of reference information.

13. The method of claim 11, wherein the step of dynamically updating the received plurality of reference information comprises:
  updating the received plurality of reference information when a number of stations compatible with beamforming changes.

14. The method of claim 11, wherein the step of dynamically updating the received plurality of reference information comprises:
  updating the received plurality of reference information when a state of at least one specific station which receives beamforming changes.

15. The method of claim 14, wherein the step of dynamically updating the received plurality of reference information comprises:
  determining that the state of the specific station receiving beamforming is changed when at least one of the following conditions is met:
  connection between the beamformer and the specific station is interrupted, a data traffic amount between the station and the specific station is lower than a threshold, connection quality between the beamformer and the specific station changes, and the specific station cannot receive a sounding packet.

16. The method of claim 1, wherein the beamformer is an access point (AP), a router, or a station set in an independent basic service set (IBSS) mode.

17. A beamformer comprising:
  a receiving circuit, arranged for receiving a plurality of reference information from each of a plurality of stations; and
  a control circuit, arranged for calculating an evaluation value indicating a communication quality of said each of the plurality of stations according to at least one reference information of the plurality of reference information, and comparing multiple evaluation values respectively corresponding to the plurality of stations, to select specific stations from the plurality of stations for performing beamforming;
  wherein evaluation values of the specific stations correspond to lowest communication qualities among the communication qualities of the plurality of stations.

18. The beamformer of claim 17, wherein the plurality of reference information is whether a station has a capability of receiving a beam, data traffic amount between a station and the beamformer, an encoding/decoding type of a station, diversity ability of a station, or connection quality between a station and the beamformer.

19. The beamformer of claim 17, wherein the control circuit dynamically updates the received plurality of reference information.

20. The beamformer of claim 17, being an access point (AP), a router, or a station set in an independent basic service set (IBSS) mode.

* * * * *